US005770631A

United States Patent [19]
Fukutomi et al.

[11] Patent Number: 5,770,631
[45] Date of Patent: Jun. 23, 1998

[54] PRODUCTION PROCESS OF CONNECTED MICROGEL PARTICLES AND ARTICLES TREATED WITH CONNECTED MICROGEL PARTICLES

[75] Inventors: Takashi Fukutomi, Tokyo; Yoshifumi Sugito, Kasukabe; Minoru Takizawa, Moriyamachi; Satoshi Mizoguchi, Asabamachi; Michiei Nakamura, Sohka; Hitoshi Takeuchi, Showamachi; Naomi Oguma, Kawagoe; Motohisa Maruyama, Kawaguchi; Shojiro Horiguchi, Omiya, all of Japan

[73] Assignee: Dainichiseika Color & Chemicals Mfg. Co., Ltd., Tokyo, Japan

[21] Appl. No.: 521,728

[22] Filed: Aug. 31, 1995

[51] Int. Cl.$^6$ .................................. C08J 5/22; C08J 5/20
[52] U.S. Cl. ................................. 521/27; 521/29; 521/32; 525/302; 428/500
[58] Field of Search ................................ 521/27, 32, 29; 525/302; 428/500

[56] References Cited

U.S. PATENT DOCUMENTS

| | | | |
|---|---|---|---|
| 4,584,246 | 4/1986 | Liu | 428/522 |
| 5,256,503 | 10/1993 | Cook | 429/249 |
| 5,425,865 | 6/1995 | Singleton | 204/252 |

OTHER PUBLICATIONS

C. M. Cheng, F. J. Micale, J. W. Vanderhoff, and M. S. El–Aasser. "Pore Structural Studies of Monodisperse Porous Polymer Particles". *Journal of Colloid and Interface Science*, vol. 150, No. 2, pp. 549–558. 1992.

Takeji Hashimoto, Satoshi Koizumi, Hirokazu Hasegawa, Tatsuo Izumitani and Stephen T. Hyde. "Observation of Mesh and Strut Structures in Block Copolymer/Homopolymer Mixtures". *Macromolecules*, vol. 25, No. 5, pp. 1433–1439. Mar. 2, 1992.

Guang Hui Ma and Takashi Fukutomi. "Determination of the Distribution of Interparticle Contact Angle in the Binary Mixture of Microgels". *Polymer International*, vol. 30, No. 4, pp. 533–539. 1993.

*Primary Examiner*—Fred Zitomer
*Attorney, Agent, or Firm*—Oblon, Spivak, McClelland, Maier, & Nuestadt, P.C.

[57] ABSTRACT

A process is disclosed for the production of connected microgel particles. According to the process, starting microgel particles having particle sizes of 100–0.01 μm and a particle size distribution whose standard deviation is not greater than 100% of a mean particle size of the starting microgel particles are dispersed in a matrix component. The starting microgel particles are soaked with a monomer. The monomer is then polymerized, whereby the starting microgels are connected together. Also disclosed is an article comprising a base material and a layer of such connected microgel particles formed on a surface of the base material.

15 Claims, 2 Drawing Sheets

PRODUCTION PROCESS OF CONNECTED MICROGEL PARTICLES AND ARTICLES TREATED WITH CONNECTED MICROGEL PARTICLES

BACKGROUND OF THE INVENTION a) Field of the Invention

This invention relates to uniformly connected microgel particles (microspheres), and more specifically to connected microgel particles useful in a wide range of fields, for example, as function membranes, adsorbents, filter materials, decorative materials and the like. This invention is also concerned with a process for the production of the connected microgel particles.

b) Description of the Related Art

High molecular microgel particles feature minuteness and a wide surface area. Utilization of these characteristics features has been widely studied to date. Further, several methods have also been studied for connecting freely-dispersed microgel particles together into a spherical body or an aggregate. No method has however been found for the connection of such microgel particles into a film- or membrane-like form, because microgel particles cannot by themselves be fused or connected together.

SUMMARY OF THE INVENTION

If it is possible to form freely-dispersed microgel particles into a film- or membrane-like shape and further to isotropically connect microgel particles of the components together, ultrasmall homogeneous spaces can be formed between the so-connected microgel particles.

Such connected microgel particle bodies are expected to show functions unknown to date and are expected to provide, for example, novel mosaic charged membranes, ion-exchange membranes, adsorbents, filter materials, encapsulating materials, decorative materials and the like. This concept, that is, isotropic connection of crosslinked microgel particles has not been contemplated and as a matter of fact, involves technical difficulties.

In one aspect of the present invention, there is thus provided a process for the production of connected microgel particles, which comprises:

dispersing, in a matrix component, starting microgel particles having particle sizes of 100–0.01 $\mu$m and a particle size distribution whose standard deviation is not greater than 100% of a mean particle size of said starting microgel particles;

soaking said starting microgel particles with a monomer; and polymerizing said monomer, whereby said starting microgels are connected together.

In another aspect of the present invention, there is also provided an article having a microgel particle layer, comprising:

a base material; and a layer of connected microgel particles produced by the above process and formed on a surface of said base material.

In a further aspect of the present invention, there is also provided a process for the fabrication of a mosaic charged membrane, which comprises:

providing microgel particles formed of a cationic copolymer containing at least 30 wt. % of 4-vinylpyridine units;

soaking said microgel particles with 4-vinylpyridine monomer; and treating said monomer-soaked microgel particles in a matrix component composed of a linear sodium styrenesulfonate copolymer to polymerize said monomer, whereby said microgel particles are connected together.

According to the present invention, microgel particles which are evenly and freely dispersed are isotropically connected together, thereby providing connected microgel particles having conventionally unknown novel physical properties, optical properties, physical strength, adhesion to a base material, and uniform and ultrasmall spaces. Further, these connected microgel particles can be formed on base materials of various shapes. If a base material has, for example, a net-like shape, it is possible to form a film-like or porous microgel particle layer conforming in shape with the net-like shape.

DETAILED DESCRIPTION OF THE INVENTION AND PREFERRED EMBODIMENTS

Figure 1:
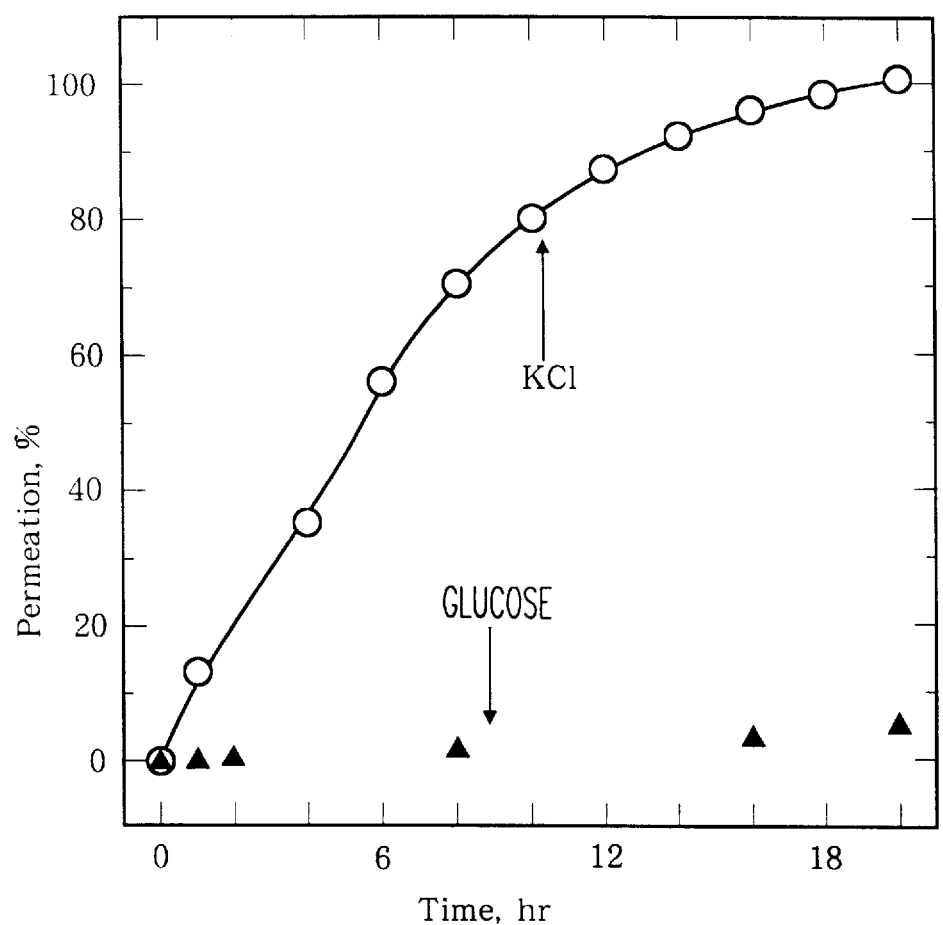
FIG. 1 is a diagrammatic representation of the results of a separation test between KCl and glucose by a membrane obtained in Example 1.

Microgel particles useful in the practice of the present invention are crosslinked microgel particles (microspheres) having particle sizes in a range of 100–0.01 $\mu$m, preferably, 10–0.05 $\mu$m.

Moreover, the particle size distribution of the microgel particles has a standard deviation not greater than 100% of the mean particle size, with 50% or smaller being preferred. Microgel particles with an unduly broad particle size distribution, upon connection, result in the formation of irregular spaces between the microgel particles. Such an excessively broad particle size distribution is therefore not preferred. It is therefore necessary to limit the particle size distribution to 100% or smaller.

In addition, a particle size smaller than 0.01 $\mu$m makes it difficult to maintain the uniformity of microgel particles upon connection whereas a particle size greater than 100 $\mu$m leads to difficulty in dispersing microgel particles in a matrix. Outside the range of 100–0.01 $\mu$m, it is therefore difficult to have microgel particles connected together and even if connected, the thus-connected body has a problem in retaining its structure.

Typical examples of monomers usable for the preparation of microgel particles can include styrene, and styrene derivatives such as $\alpha$-methylstyrene and chloromethylstyrene; (meth)acrylate esters and derivatives thereof, such as methyl (meth)acrylate, ethyl (meth)acrylate, propyl (meth)acrylate, butyl (meth)acrylate, lauryl (meth)acrylate, stearyl (meth)acrylate, hydroxymethyl (meth)acrylate, hydroxyethyl (meth)acrylate, polyethylene glycol (meth)acrylate (polymerization degree of ethylene oxide: 2–20), hydroxypropyl (meth)acrylate, and polypropylene glycol (meth) acrylate; vinyl acetate; monomers containing primary to tertiary amino groups; pyridinium-containing monomers and quaternization products thereof; and as anionic monomers, monomers containing a sulfone or carboxylic group which may be either in the free form or in a salt form.

Where a monomer contains a group in a salt form, hydrochloric acid, sulfuric acid, phosphoric acid, an organic acid or the like is used as a pairing ion for a cationic group whereas an alkali metal, ammonia, a lower amine, an alkanolamine or the like is used as a pairing ion for an anionic group.

Specific examples of cationic polymers can include polyvinylpyridine and its quaternization product, poly(2-hydroxy-3-methacryloylxypropyltrimethylammonium chloride), polydimethylaminoethyl methacrylate, polydimethylaminoethyl methacrylate, and salts thereof.

Specific examples of anionic polymers can include polystyrenesulfonic acid, poly(2-acryloylamino-2methylpropanesulfonic acid), poly(2-acrylamido-2propanesulfonic acid), polymethacryloyloxypropylsulfonic acid, polysulfopropyl methacrylate, poly(2-sulfoethyl methacrylate), polyvinylsulfonic acid, polyacrylic acid, styrene-maleic acid copolymers, and salts thereof.

Also included are copolymers of the monomers forming the above-described cationic or anionic polymers as well as copolymers of such monomers with other monomers.

From the above-described nonionic, cationic or anionic monomer, microgel particles are produced by a process known per se in the art such as soap-free polymerization, emulsion polymerization, reversed phase polymerization or seeded polymerization. To allow the resulting microgel particles to retain their shapes subsequent to their connection, the microgel particles are produced by choosing a monomer which can form a polymer having a glass transition point (Tg) of 10° C. or higher, preferably 50° C. or higher or having no melting point.

In the present invention, it is preferred to use microgel particles whose microsphere-forming polymer is crosslinked. Illustrative examples of a crosslinking agent for crosslinking microspheres to form microgel particles can include divinylbenzene, methylenebisacrylamide, ethylene glycol dimethacrylate, 1,3-butylene glycol methacrylate, and other tri- and tetrafunctional acrylates. These crosslinkable monomers can each be used in an amount of 30–0.05 parts by weight, preferably 20–0.1 part by weight per 100 parts by weight of a non-crosslinkable monomer.

In the present invention, the microgel particles obtained as described above are soaked with a monomer to connect these particles. This monomer can be the same as or different from the monomer of the microgel particles or a mixture of the same monomer and a different monomer. It is preferred to have microgel particles soaked with a monomer mixture which contains the same monomer as that of the microgel particles in an amount of at least 10 wt. %, preferably 30 wt. % or more based on the whole monomer to be employed for soaking the microgel particles.

The amount of the monomer to be employed for soaking the microgel particles is 5–2,000 parts by weight, preferably 10–1,000 parts by weight per 100 parts by weight of the microgel particles. An amount smaller than 5 parts by weight makes connection of microgel particles difficult, whereas an amount greater than 2,000 parts by weight makes it difficult to achieve soaking of the microgel particles with the monomer. Here, a crosslinkable monomer can be mixed with the soaking monomer.

A polymerization initiator which is employed for the polymerization of the monomer used to soak the microgel particles is a polymerization initiator which can be dissolved in the monomer.

Where the soaking monomer is not an ionic monomer, usable examples of the polymerization initiator include solvent-soluble polymerization initiators such as 2,2'-azobisisobutyronitrile, 2,2'-azobis(methyl isobutyrate), 1,1'-azobis(cyclohexanecarbonitrile), cumene hydroperoxide, dicumyl peroxide, benzoyl peroxide, and lauryl peroxide.

Where the soaking monomer is an ionic monomer, usable examples of the polymerization initiator include water-soluble polymerization initiators such as 2,2'-azobis(2-amidinopropane) dihydrochloride, 2,2'-azobis(2-amidinopropane)diacetate, 2,2'-azobis(N,N'dimethyleneisobutylamidine) dihydrochloride, ammonium peroxide and potassium persulfate. When the monomer is subjected to seeded polymerization, it is necessary to choose a polymerization initiator which is insoluble in a solvent as a dispersion medium for the microgel particles.

The matrix component is a conventionally known polymer. Illustrative examples of the polymer include, in addition to polymers formed from the monomers exemplified above with respect to the microgel particles, polyvinyl alcohol and butyral resins thereof; ethylenevinyl acetate copolymers, and their saponification products and chlorinated products; polyethylene and its chlorinated products; polybutadiene; polyisoprene; styrene-butadiene copolymers; polyvinyl chloride; vinyl chloride-vinyl acetate copolymers; polyurethanes; polyethylene, polyethylene; polyethylene oxide; polysulfones; polyamides; polyamide-imides; polyimides; cellulose; cellulose acetate; cellulose acetate butyrate; nitrocellulose; chitosan and its derivatives; melamine resins; and epoxy resins and their derivatives. Regarding the arrangement of monomer molecules in each of such copolymers, the copolymer can be a random, block or graft copolymer.

For the connection of microgel particles, two processes can be mentioned as will be described below.

As a first process, microgel particles and a matrix component are mixed in a suitable medium and the resulting mixture is then coated on an appropriate base material. The thus-coated base material is left standing so that the microgel particles are allowed to align on a surface of the base material. The medium is then removed, whereby the microgel particles are fixed in the matrix. The microgel particles are then immersed in a monomer solution which contains a polymerization initiator. The microgel particles are hence soaked with the monomer. As a result of the absorption of the monomer, the microgel particles are caused to swell so that their particle sizes become greater. The microgel particles accordingly overlap with each other. When the thus-penetrated monomer is polymerized in this state, the adjacent microgel particles are connected together at points of contact therebetween.

Inclusion of a crosslinkable monomer (polyfunctional monomer) in the monomer employed for soaking microgel particles makes it possible to insolubilize the polymer by which the microgel particles are connected.

According to a second process, microgel particles are impregnated with a monomer in a suitable medium. The monomer is then polymerized to obtain a dispersion. This dispersion is mixed with and dispersed in a solution of a matrix component. The dispersion so formed is coated on an appropriate base material. The thus-coated base material is then left standing so that the microgel particles are allowed to align on a surface of the base material. The solvent is then removed to fix the microgel particles on the base material. To vapor of a good solvent for a polymer formed from the monomer penetrated in the microgel particles, a layer of the microgel particles is exposed so that the polymer formed inside the microgel particles is caused to dissolve out to the surfaces of the particles. Using the polymer as a connecting agent, the microgel particles are connected.

In each of the above-described processes, the matrix which still remains together with the connected microgel particles may be left as is or may be eliminated from the connected microgel particles. When the matrix is left as is, the matrix can then be crosslinked to make it insoluble to solvents.

In each of the processes described above, the elimination of the matrix from the connected microgel particles makes it possible to produce a porous body formed of the connected microgel particles. Further, the porous body so obtained can then be treated with another organic material or inorganic material or pores of the porous body can be filled with such a material. Examples of the filler organic material include the polymers exemplified above as matrix components and liquid crystal materials, whereas amorphous silica and the like can be mentioned as illustrative inorganic materials.

For the insolubilization of the matrix, any usual crosslinking reaction for high molecules can be employed. The matrix can be crosslinked, for example, by using functional groups of the matrix polymer and then crosslinking the functional groups together with a crosslinking agent. Crosslinkages can be formed, for example, using ester bonds, ether bonds, urethane bonds, quaternization of an amine or pyridine, thioether bonds, or the like. Usable crosslinking agents include polyfunctional compounds which contain one or more hydroxyl groups, carboxyl groups, amino groups, pyridinium groups, epoxy groups, isocyanate groups, mercapto groups, aldehyde groups, acid chloride groups, acid amido groups or the like. To eliminate the matrix from the connected microgel particles, the matrix can be extracted with a good solvent for the matrix or the matrix can be thermally decomposed.

A connected body of microgel particles can be obtained as described above. This connected body can be used as is. For example, a mosaic charged membrane which is obtained by using cationic microgel particles as microgel particles to be connected and an anionic matrix polymer as a matrix component can be used in the form of a film.

As an alternative, a product obtained by eliminating the matrix component from the above-described mosaic charged membrane is useful as an ion-exchange membrane.

Further, a layer of a connected body of microgel particles, said layer being firmly bonded to a base material, can be obtained when a composition containing unconnected microgel particles and a matrix component is coated on a surface of the base material, the microgel particles are connected and the matrix component is then eliminated. Moreover, removal of the base material from such a structure results in a connected body of microgel particles, said body being in the form of a film defining a number of micropores therein.

The above-described connected body of microgel particles is a continuous body defining therein uniform micropores of about 200–0.001 μm in diameter. Microgel particle films defining such micropores therein can be used, for example, as encapsulating materials and additives for perfumes and pharmaceuticals, in addition to adsorbents and filter materials.

In the connected microgel particles according to the present invention, the microgel particles are regularly aligned so that as an optical property, they cause interference of visible light and produce iridescence. As a further application field of connected microgel particles according to the present invention, use of this iridescence also makes it possible to use the connected microgel particles as various decorative materials.

The present invention will hereinafter be described more specifically by the following Referential Examples and Examples, in which all designations of "part" or "parts" and "%" are part or parts by weight and wt. % unless otherwise specifically indicated.

PREPARATION EXAMPLES OF MATERIALS

Referential Example 1

[Synthesis of microgel particles (C-SPH-P4VP) of 4-vinylpyridine]

Charged in a flask were 500 ml of water, 10 parts of 4-vinylpyridine, 1 part of divinylbenzene and 0.1 part of 2,2'-azobis(2-methylpropinoamidino) dihydrochloride. The contents were reacted at 80° C. for 8 hours under a nitrogen gas atmosphere, whereby an emulsion-like reaction mixture was obtained. Purification of this emulsion-like reaction mixture was conducted using a dialysis membrane made of cellulose. The particle sizes of particles so obtained (microgel particles) were measured by the dynamic light-scattering method. The mean diameter was 270 nm and the standard deviation (S.D) was 60 nm.

[Preparation of a seeded polymer]

Stirred in a reaction vessel were 100 parts (solid content: 2%) of an aqueous dispersion of the above-prepared microgel particles (C-SPH-P4VP). A solution consisting of 2 parts of 4-vinylpyridine and 0.04 part of 2,2'-azobisisobutyronitrile was added dropwise to the reaction vessel. The contents were stirred for about 8 hours and then allowed to stand for 3 days, whereby the microgel particles were soaked with the above monomer.

Under a flow of nitrogen gas, the contents were next heated to 65° C., at which they were reacted for 10 hours. The reaction mixture was cooled, and the microgel particles were then purified using a dialysis membrane. The dispersion so purified has a solid content of 2.75%. The particle size distribution of the microgel particles was then measured by the dynamic light-scattering method. The mean particle size was about 300 nm and the S.D. was 32 nm.

Referential Example 2

[Synthesis of an aqueous solution of an uncrosslinked sodium polystyrenesulfonate copolymer: L-PSSNa]

Charged in a reaction vessel were 72 parts of sodium polystyrenesulfonate, 24 parts of acrylamide, 600 parts of water and 3 parts of 2,2'-azobis(2-methylpropinoamidino) dihydrochloride, followed by polymerization at 70° C. under a nitrogen gas stream for 8 hours. The polymerization mixture was purified from acetone-water by the reprecipitation method, followed by drying to obtain L-PSSNa. The number average molecular weight of the polymer was about 40,000.

Referential Example 3

[Preparation of polymethyl methacrylate microgel particles]

Charged in a reaction vessel were 30 parts of methyl methacrylate, 1.5 parts of hydroxyethyl methacrylate, 3 parts of divinylbenzene, 0.3 part of 2,2'-azobis(2-methylpropinoamidino) dihydrochloride and 500 parts of water. The contents were polymerized under a nitrogen gas stream at 80° C for 8 hours, whereby an emulsion polymerization product was obtained. This emulsion polymerization product was filtered by a pressure filter and then washed with water to purify the resultant microgel particles. This paste of microgel particles was redispersed in water. The particle size distribution of the microgel particles was measured by the dynamic light-scattering method. The mean particle size was about 200 nm and the S.D was 30 nm.

Referential Example 4

[Preparation of polystyrene microgel particles]

Charged in a reaction vessel were 30 parts of styrene, 0.3 part of acrylamide, 0.45 part of divinylbenzene, 4.5 parts of polyvinylpyrrolidone, 0.45 part of 2,2'-azobisisobutyronitrile and 300 parts of ethanol, followed by reaction under a nitrogen gas stream for 8 hours. The particle size distribution of the resultant microgel particles was measured by the dynamic light-scattering method. The mean particle size was 1,500 nm and the S.D. was 200 nm.

Referential Example 5

[Preparation of sodium polystyrenesulfonate microgel particles]

Charged in a flask were 10 parts of sodium styrenesulfonate, 2 parts of hydroxyethyl methacrylate, 1 part of methylenebisacrylamide, 0.2 part of 2,2-azobis(2-aminopropane)diacetate and 247 parts of water, followed by polymerization under a nitrogen gas stream at 60° C for 10 hours. After the polymerization, methanol was added to the polymerization mixture so that the resultant polymer microgel particles were caused to precipitate. As a result of measurement with a scanning electron microscope, the particle size of the microgel particles was found to be 30 nm.

Example 1

Mixed were 6.7 parts of the cationic microgel particles (C-SPH-P4VP) (solid content: 2.75%) prepared in Referential Example 1, 2.13 parts of an aqueous solution of the anionic polymer (L-PSSNa) (solid content: 23.65%) prepared in Referential Example 2 and 0.71 part of glutaraldehyde (solid content: 50%). The resulting mixture was cast on a glass plate and then dried in air. Thereafter, the thus-obtained film was treated in an atmosphere of hydrochloric acid gas for 3 hours, neutralized with an aqueous solution of sodium acetate, thoroughly washed with water, dried in air, and then allowed to stand for 3 days in an atmosphere of butane diiodide and methanol (crosslinking between P4VP molecules). Further, the resulting film was treated for 3 days in an atmosphere of methyl iodide, whereby a mosaic charged membrane of about 100 μm in thickness was obtained.

The results of a separation test between an electrolyte, KCl, and a non-electrolyte, glucose, both at 0.05 mole/l, by the membrane is diagrammatically illustrated in FIG. 1. The membrane permeation rate of KCl was fast and the KCl/glucose separation ratio was 25.

The above-described separation test was conducted in the following manner.

Two 75 ml containers were provided. Fifty milliliters of a solution of KCl (electrolyte) and glucose (non-electrolyte), each at 0.05 mole/l, were placed in one of the containers, that is, the container A, while 50 ml of deionized water were placed in the other container B. The above-produced mosaic charged membrane was held between these two solutions and, while stirring the solutions in both the containers, variations in concentration of the components permeated from the container A into the container B through the membrane were measured. As both the solutions were in equilibrium when the concentration of the solution in the container A had dropped to ½, the concentration of 0.025 mole/l was taken as 100%.

Example 2

Figure 2:
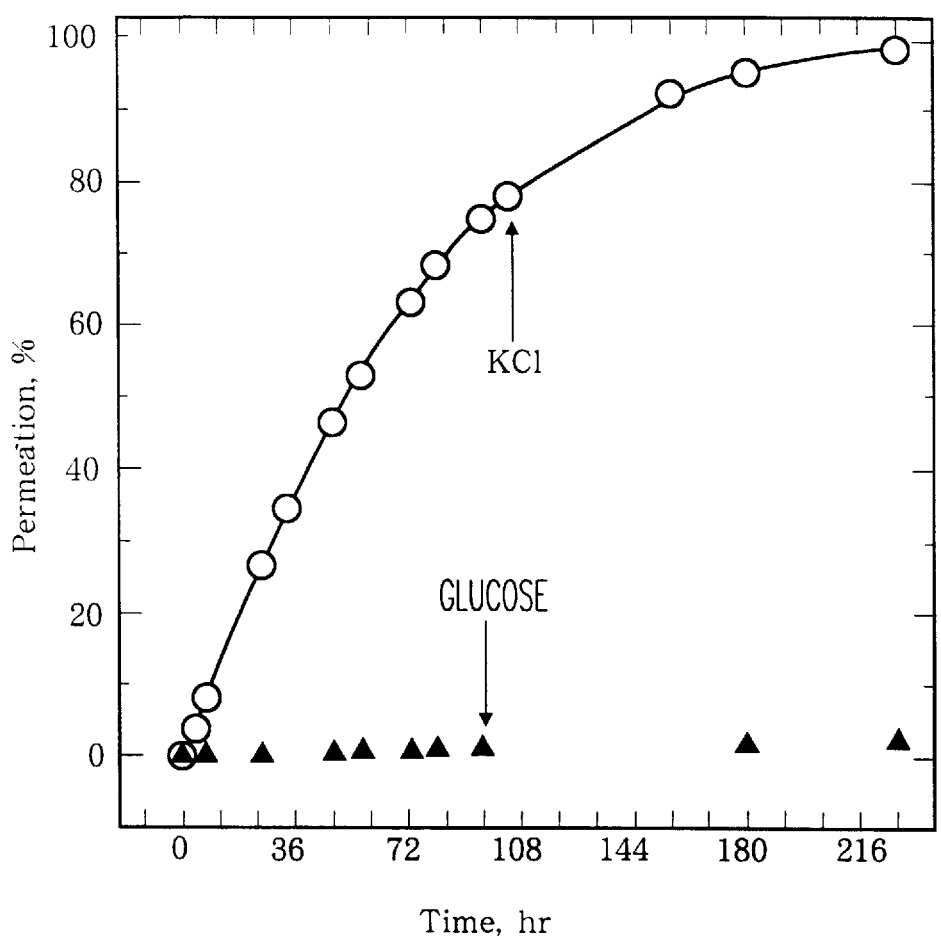
FIG. 2 is a diagrammatic representation of the results of a separation test between KCl and glucose by a membrane obtained in Example 2.

A mosaic charged membrane of about 200 g/m$^2$ in thickness was obtained in a similar manner as Example 1 except for the use of a 400 mesh stainless steel screen as a support. This membrane had extremely good adhesion to the stainless screen, and also showed excellent flexibility without development of cracks therein even when deformed. A separability test between KCl and glucose was conducted as in Example 1. The results are diagrammatically shown in FIG. 2.

Comparing the results of Example 2 with those of Example 1, the membrane penetrate rate was slower but the separability was extremely good. The KCl/glucose separation ratio was 100 so that extremely good separability was demonstrated. Even in a continuous test for about 1 month, the permeation of glucose was as little as 1% or so.

Example 3

The polymethyl methacrylate microgel particles (6.0 parts) prepared in Referential Example 3 were dispersed in 94 parts of water, followed by mixing for 10 hours with 26 parts of a 10% aqueous solution of polyvinyl alcohol ("KURARAY PVA-205", trade name; average molecular weight: 550±50; product of Kuraray Co., Ltd.). The resulting mixture was cast on an ethylenevinyl acetate copolymer film so that the mixture was formed into a film. This film showed interference colors (bluish iridescence) when exposed to visible light. This means that the polymethyl methacrylate microgel particles are in a regular alignment within the PVA matrix.

The film formed as described above was immersed for 24 hours in a liquid mixture consisting of 18 parts of methyl methacrylate, 0.018 part of 2,2'-azobisisobutyronitrile, 200 parts of acetone and 70 parts of water, whereby the microgel particles were soaked with the monomers. The thus-soaked film was then placed in a closed vessel and maintained at 55° C. for 8 hours under a nitrogen gas atmosphere, so that the monomers penetrated in the microgel particles were polymerized. After the polymerization of the monomers, the film was subjected to the glutal treatment and the hydrogen chloride gas treatment. The film was therefore converted into an integral form. This film showed iridescence. This iridescent film is useful as a decorative material and can be bonded under heat to various materials.

Example 4

The polymethyl methacrylate microgel particles (6.0 parts) obtained in Referential Example 3 were dispersed in 94 parts of water. This dispersion was mixed with 60 parts of a 10% aqueous solution of polyvinyl alcohol. The mixture so obtained was poured into a shallow glass-made container. A polyester-made non-woven fabric (200 g/m$^2$, thickness: 0.25 mm) was downwardly pressed and bonded to the mixture and was then left over until dryness. The amount of the dispersion so impregnated to the non-woven fabric was about 150 g/m$^2$ in terms of solids. Charged next to the glass-made container was a liquid mixture which consisted of 30 parts of methyl methacrylate, 0.3 part of 2,2'-azobisisobutyronitrile, 200 parts of acetone and 70 parts of water. The above-described non-woven fabric was immersed for 24 hours, whereby the microgel particles were impregnated with the monomer. The above non-woven fabric was then placed in a reaction flask and the monomer penetrated into the microgel particles was polymerized under a nitrogen gas stream at 60° C. Accordingly, the microgel particles wee connected within the non-woven fabric. The non-woven fabric with the microgel particle so connected therein was then treated with hot water so that PVA as the matrix was dissolved and eliminated. A porous material composed of the thus-connected microgel particles was obtained. The pore size of this porous material was estimated to be 0.1 μm or so, so that the porous material is useful as a filter material.

Example 5

A mosaic charged membrane making use of a stainless screen as a base material, which had been obtained as in Example 2 except for the substitution of PVA for L-PSSNa, was subjected to crosslinking treatment and quaternization with butane diiodide and methyl iodide. The thus-obtained mosaic charged membrane was useful as an anion-exchange membrane.

Example 6

The sodium polystyrene sulfonate microgel particles (3.0 parts) obtained in Referential Example 5 and 13 parts of a 10% solution of polystyrene ("DIALEX HF77", trade name; product of Mitsubishi Monsanto Chemical Company) were mixed and dispersed for 10 hours. The dispersion was coated on a porous ceramic sheet (pore size: 0.5 μm, thickness: 2 mm). The dioxane was caused to evaporate at room temperature so that a film was formed. The coat amount was 300 g/m$^2$ in terms of solids. This film was immersed for 24 hours in a liquid mixture which consisted of 9.0 parts of sodium styrenesulfonate, 1.8 parts of hydroxyethyl methacrylate, 0.5 part of methylene bisacrylamide, 0.3 part of 2,2-azobis (2-aminopropane)diacetate, 100 parts of water and 35 parts of dioxane, so that the microgel particles in the film were soaked with the monomers. In a closed vessel, the monomers so penetrated were subjected to seeded polymerization under a nitrogen gas stream at 55° C. for 8 hours. After the polymerization, the film was immersed in a dioxane solution so that the polystyrene matrix was eliminated. The porous ceramic body formed of the connected microgel particles obtained as described above had anionic properties and was useful as a separation membrane for cationic substances and also as an adsorbent for cationic substances.

We claim:

1. A process for the production of connected microgel particles, which comprises:
    dispersing, in a matrix component, starting microgel particles having particle sizes of 100–0.01 μm and a particle size distribution whose standard deviation is not greater than 100% of a mean particle size of said starting microgel particles;
    soaking said starting microgel particles with a monomer; and
    polymerizing said monomer, whereby said starting microgels are connected together in a matrix.

2. A process according to claim 1, wherein said starting microgel particles have been formed by copolymerization of 100 parts by weight of a non-crosslinkable monomer and 30–0.05 part by weight of a crosslinkable monomer.

3. A process according to claim 1, wherein said starting microgel particles are soaked with 5–2,000 parts by weight of said monomer per 100 parts by weight of said starting microgel particles.

4. A process according to claim 1, wherein said monomer for soaking said starting microgel particles contains at least 10 wt. % of another monomer which is the same as that constituting said starting microgel particles.

5. A process according to claim 1, wherein a polymer which makes up said starting microgel particles has a glass transition point of 10° C. or higher.

6. A process according to claim 1, wherein said starting microgel particles are formed of a copolymer which contains at least 30 wt. % of methyl methacrylate or styrene.

7. A process according to claim 1, which comprises:
    arranging said first microgel particles in said matrix component;
    soaking said starting microgel particles with said monomer; and
    polymerizing said monomer, whereby said starting microgel particles are connected together.

8. A process according to claim 1, which comprises:
    soaking said starting microgel particles with said monomer;
    polymerizing said monomer into a polymer; and
    treating said polymer with vapor of a solvent, whereby said starting microgel particles are connected together with said polymer as a connecting agent.

9. A process according to claim 1, wherein said starting microgel particles have ionic properties.

10. A process according to claim 1, wherein said starting microgel particles are formed of a cationic polymer containing at least 30 wt. % of 4-vinylpyridine units.

11. A process according to claim 1, further comprising eliminating said matrix component from said matrix in which said connected microgel particles are contained.

12. A process according to claim 1, which comprises:
    forming on a base material a layer of a dispersion composed of said starting microgel particles and said matrix component;
    soaking said starting microgel particles with a monomer; and
    polymerizing said monomer.

13. A process according to claim 1, which comprises:
    soaking said starting microgel particles with said monomer;
    polymerizing said monomer into a polymer, thereby providing a polymer-containing microgel particles;
    forming, on a base material, a layer with a mixture of said polymer-containing microgel particles and said matrix component;
    treating said layer with vapor of a solvent for said polymer, whereby said starting microgel particles are connected together.

14. A process according to claim 1, further comprising:
    eliminating said matrix component from said matrix in which said connected microgel particles are contained; and
    impregnating pores, which have been formed as a result of the elimination of said matrix component, with another material, whereby a new matrix is formed.

15. A process for the fabrication of a mosaic charged membrane, which comprises:
    providing microgel particles formed of a cationic copolymer containing at least 30 wt. % of 4-vinylpyridine units;
    soaking said microgel particles with 4-vinylpyridine monomer; and
    treating said monomer-soaked microgel particles in a matrix component composed of a linear sodium styrenesulfonate copolymer to polymerize said monomer, whereby said microgel particles are connected together.

* * * * *